(12) United States Patent
Griffin et al.

(10) Patent No.: US 7,164,733 B1
(45) Date of Patent: Jan. 16, 2007

(54) METHOD AND DEVICE FOR COMPENSATING FOR DIGITAL DATA DEMODULATION PHASE UNCERTAINTY

(75) Inventors: Dan M. Griffin, Bountiful, UT (US); Randal R. Sylvester, West Valley City, UT (US)

(73) Assignee: L-3 Communications Corporation, New York, NY (US)

( * ) Notice: Subject to any disclaimer, the term of this patent is extended or adjusted under 35 U.S.C. 154(b) by 751 days.

(21) Appl. No.: 10/273,929

(22) Filed: Oct. 17, 2002

(51) Int. Cl.
*H04L 27/00* (2006.01)
(52) U.S. Cl. ...................................... 375/324
(58) Field of Classification Search ................ 324/650, 324/649, 600; 326/99; 340/870.25, 870.01; 375/226, 224, 227, 228, 371, 354, 373, 375, 375/377, 324, 322, 316; 702/72, 71, 66, 702/57, 85, 106
See application file for complete search history.

(56) References Cited

U.S. PATENT DOCUMENTS

| | | | | |
|---|---|---|---|---|
| 4,771,438 A | * | 9/1988 | Nash | 375/235 |
| 5,519,625 A | * | 5/1996 | Chu | 702/176 |
| 6,226,302 B1 | * | 5/2001 | Kaku et al. | 370/477 |
| 6,366,895 B1 | * | 4/2002 | Woodsum et al. | 706/13 |

* cited by examiner

Primary Examiner—Pankaj Kumar
(74) Attorney, Agent, or Firm—Harrington & Smith, LLP

(57) ABSTRACT

A method and system for compensating digital data demodulation phase uncertainty is provided. The method includes the steps of identifying a phase reference quadrant, the phase reference quadrant having a phase reference axis and four quadrants, I, II, III, and IV; receiving known digital data; and forming a phase vector from the known digital data, determining which quadrant the phase vector is located in and rotating the phase vector to the phase reference quadrant if it is determined that the phase vector is not located in the phase reference quadrant. The last step generates a phase error signal proportional to the resulting angle by rotating the phase vector −45° and measuring the resulting angle between the phase vector and the phase reference axis.

15 Claims, 3 Drawing Sheets

METHOD AND DEVICE FOR COMPENSATING FOR DIGITAL DATA DEMODULATION PHASE UNCERTAINTY

BACKGROUND

1. Field of Use

These teachings relate generally communications systems such as wireless data or telephone systems. More particularly, the invention relates to compensating phase error and phase ambiguity in digital data demodulation systems.

2. Description of Prior Art

A variety of multiple access communication systems have been developed for transferring information among a large number of system users. Techniques employed by such multiple access communication systems include time division multiple access (TDMA), frequency division multiple access (FDMA), and AM modulation schemes, such as amplitude companded single sideband (ACSSB), the basics of which are well known in the art.

Transmission over terrestrial, global, and extraterrestrial distances requires the use of modulated carriers and, for modern applications, Quadrature Phase Shift Keying (QPSK) and Quadrature Amplitude Modulation (QAM) are often used to exploit the advantages offered by digital modulation techniques.

Yet, as is known in the art, the coherent reception of a quadrature-modulated signal requires the demodulation circuit to unambiguously determine the transmitted signal phase. The phase as observed by the demodulator is determined from orthogonal components of the received signal referred to as the in-phase (I) channel and the quadrature (Q) channel. QPSK modulation uses the two transmitted bits to select one of four possible phases: ±45° or ±135°. The phase recovery is typically done in two steps: a sub-quadrature phase error resolution step and then a quadrature error phase resolution step.

Sub-quadrature phase error may result from mismatches between the transmitter and the receiver components, e.g., clocks or oscillators, relative platform motion, and environmental conditions along the signal path. The sub-quadrature phase error is determined by generating a phase error with respect to the closest of the four allowed transmission phases and then using a tracking loop to minimize the error provides sub-quadrature phase resolution. This is equivalent to removing the data by mapping the received signal to the first quadrant of the I/Q plane. Prior art approaches generally perform or approximate an Arc Tan operation using the I and Q data to determine the sub-quadrature phase error. The technique is well known in the art and need not be discussed here. However, it will be appreciated by those skilled in the art that the technique of performing an Arc Tan operation is computationally intensive and requires significant hardware recourse.

The method of sub-quadrature phase resolution described above may lock on to the correct phase or one of the other three incorrect phases. Prior art approaches correlate the output of the sub-quadrature phase tracking loop to a known data pattern to resolve the remaining quadrature phase ambiguity. This prior art technique and similar techniques require complex system hardware and/or software due to the extra correlation and rotation circuitry required.

Therefore it is desirable to compensate for sub-quadrature phase error and quadrature phase ambiguity with one phase detector, which makes more efficient use of hardware resources.

SUMMARY OF THE PREFERRED EMBODIMENTS

The foregoing and other problems are overcome, and other advantages are realized, in accordance with the presently preferred embodiments of these teachings. As will be described below, important aspects of the invention reside in the efficient use of hardware resources to resolve quadrature phase ambiguity and track sub-quadrature phase error.

In accordance with one embodiment of the invention a method for compensating data demodulation total phase uncertainty is provided. The method assumes that a known block of data has been transmitted and that the receiver has determined its location in the received signal. The steps include removing the known data and then determining an error signal with respect to the expected 45° phase position. The resulting phase error is then used to correct both the sub-quadrature error and the quadrature ambiguity using a tracking loop. Upon completion of error resolution the transmitted data is recovered.

In accordance with one embodiment of the invention a method for compensating digital data demodulation phase uncertainty is provided. The method includes the steps of identifying a phase reference quadrant, the phase reference quadrant having a phase reference axis and four quadrants, I, II, III, and IV; receiving known digital data; and forming a phase vector from the known preamble data, determining which quadrant the phase vector is located in and rotating the phase vector to the phase reference quadrant if it is determined that the phase vector is not located in the phase reference quadrant. The last step generates a phase error signal proportional to the resulting angle by rotating the phase vector −45° and measuring the resulting angle between the phase vector and the phase reference axis.

In accordance with another embodiment of the invention an integrated circuit (IC) is provided. The IC includes a circuit loop having a phase shifter and a phase error calculator. The phase error calculator is coupled to the phase shifter and a phase loop filter. A phase accumulator completes the loop by coupling the phase loop filter back to the phase shifter.

The invention is also directed towards a program storage device readable by a machine, tangibly embodying a program of instructions executable by the machine to perform method steps for compensating digital data demodulation phase uncertainty. The method includes the steps of identifying a phase reference quadrant and receiving digital preamble data. A phase vector is formed from the known digital data and depending upon which quadrant the phase vector is located in, the phase vector is rotated to the phase reference quadrant (if it is determined that the phase vector is not located in the reference quadrant). The next step generates a phase error signal proportional to the resulting angle based upon rotating the phase vector −45° and measuring the resulting angle between the phase vector and the phase reference axis.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
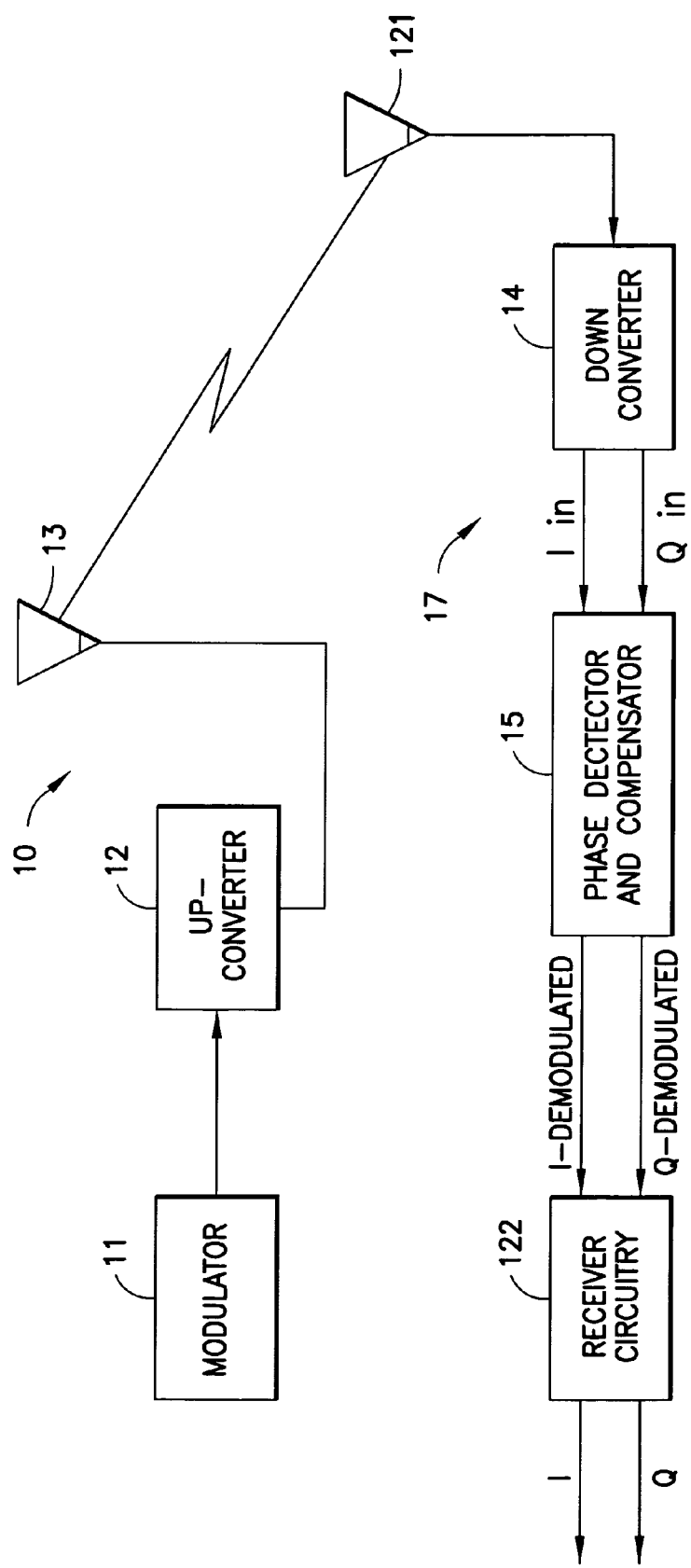
FIG. 1 is a block diagram of a mobile device and a base station connected to a wireless local area network incorporating features of the present invention.

Although the present invention will be described with reference to the embodiment shown in the drawings, it should be understood that the present invention could be embodied in many alternate forms of embodiments. Exemplary, but not limiting embodiments include: mobile telephone systems requiring the reception and/or transmission of data and/or a satellite data system where information in the form of data is transmitted to a user.

Referring now to FIG. 1 there is shown an illustration for a transmitter 10, such as such as might be used in, but not limited to wireless local area networks (LANs) that are suitable for practicing this invention. It should be understood that the transmitter 10 could be vehicle mounted or a stationary device.

The transmitter 10 includes an antenna 13 for transmitting signals to a receiver 17. The transmitter 10 also includes a modulator 11 and up-converter 12 for preparing data signals for transmission. Exemplary, but not limiting, modulation techniques include direct sequence spread spectrum (DSSS) or Frequency Hop Spread Spectrum (FHSS) systems.

It is understood that the receiver 17 complements the transmitter capabilities and also includes circuitry required for implementing the well-known process of multiplying a bandpass signal by a periodic signal to obtain a new center frequency, i.e., mixing. Receiver 17 also includes an antenna 121 for reception of signals transmitted by transmitter 10 and a down-converter 14. It will be understood that down-converter 14 complements up-converter 12. Receiver 17 also contains receiver-circuitry 122 for extracting data from the demodulated I-demodulated and Q-demodulated signals once the phase detector and compensator 15 has corrected phase deviation. It will also be appreciated that receiver 17 and/or components of phase detector and compensator 15 may reside on an integrated circuit (IC) such as, for example but not limited to, an application specific IC (ASIC) or field programmable gate array (FPGA) programmable by Hardware Description (HDL) Language file(s) such as a Very High Speed Integrated Circuit (VHSIC) HDL file.

Figure 2:
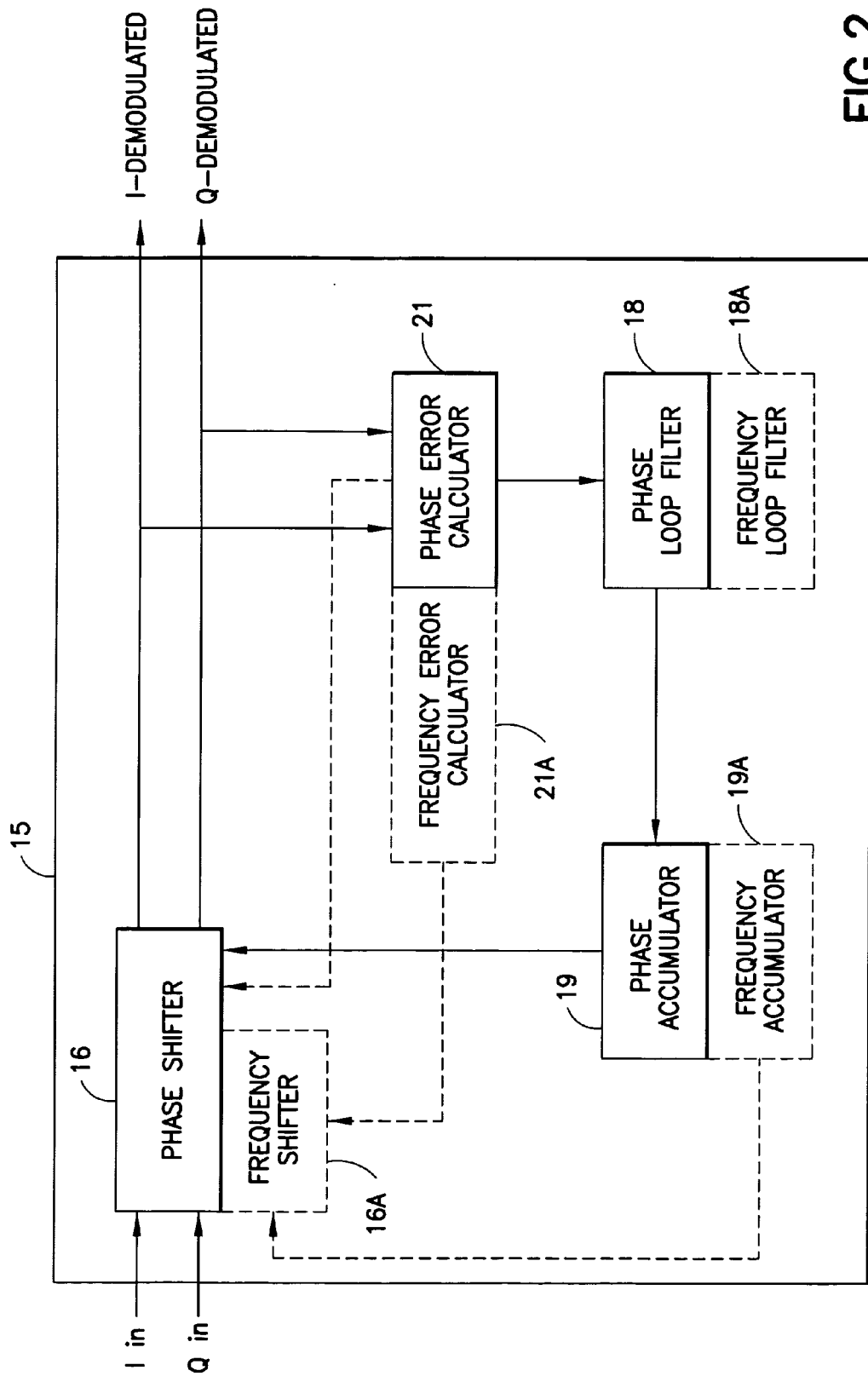
FIG. 2 is a block diagram of the phase detector and compensator shown in FIG. 1.

Referring also to FIG. 2 there is shown a block diagram of phase detector and compensator 15. It will be understood that since the transmitter 10 and the receiver 17 do not share the same reference clocks a carrier frequency and phase error occurs between the modulator 11 and demodulator within the down-converter 14. In a coherent demodulator the frequency and phase difference between the transmitted frequency and the received frequency must be compensated in order to retrieve the transmitted data. For large frequency errors, generally a frequency in excess of a predetermined percentage of the symbol rate, a frequency error calculation may be performed by frequency error calculator 21A and then filtered by the frequency loop filter 18A and applied to the frequency accumulator 19A. The frequency accumulator 19A then drives the frequency shifter 16A at a frequency opposite to the detected frequency error until the frequency error is below some predetermined value.

Once the frequency error is less than a predetermined value of the symbol rate then phase error calculator 21 determines phase uncertainty. The output of phase error calculator 21 is loop filtered by phase loop filter 18 and then applied to the frequency-to-phase accumulator 19. The output of frequency-to-phase accumulator 19 drives the phase shifter 16 with an appropriate phase command keeping the phase error as small as possible. In an alternate embodiment the phase error calculator 21 may drive the phase shifter directly. The loop through phase error calculator 21, phase loop filter 18, and phase accumulator 19 eventually locks the I and Q demodulated data to the correct phase so that the data is useable.

In a QPSK system the phase error calculation can only lock the data to one of four quadrants of the I/Q complex data plain. Another method must be used to correct the four-phase ambiguity of a QPSK (or QAM system). Methods to solve the phase ambiguity are to look at a known pattern in the demodulated data and fix the ambiguity based upon this known pattern. To allow the receiving system to find frequency timing and phase, a block of known data may be used in burst type transmissions. An exemplary but not limiting example is Time Division Multiple Access (TDMA) systems where the known data is contained in a preamble message. The preamble may be used to drive the phase error and resolve the phase ambiguity.

Figure 4:
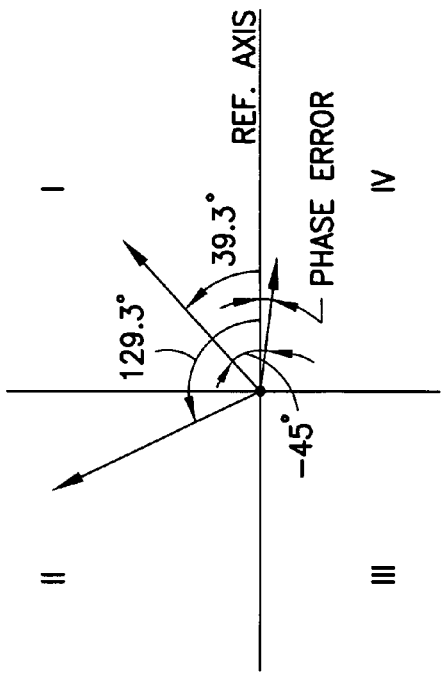
FIG. 4 is a quadrant diagram illustrating vector rotation for determining phase error for the system shown in FIG. 2.
Figure 3:
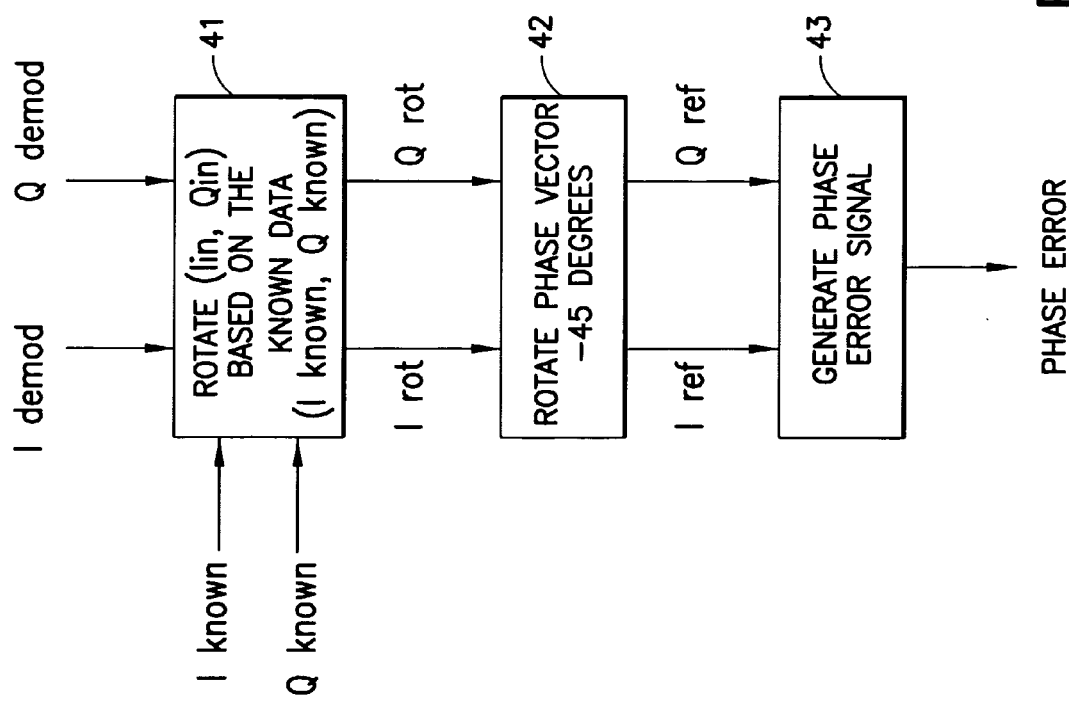
FIG. 3 is a flow chart of one method for determining phase and phase error for the system shown in FIG. 2.

Referring also to FIG. 3, the first operation performed on the received data is to rotate the received data as directed by the known data. Referring also to Table 1 there are shown the steps to rotate the received data based on the known data. In alternate embodiments any suitable frame could be chosen as the reference frame. Receiver 17, receives the known digital data and a phase vector quadrant is determined and tested according to Table 1. As shown in Table 1, if the quadrant of the preamble data is in the first quadrant then no operation is performed on the received data. If the quadrant of the preamble data is in quadrant II, for this example, then the received data is operated on such that I-data is set equal to the Q-received data and Q-data is set equal to the negative of the I-received data. The result of the operation is to effectively rotate 41 the data 90° clockwise. For example, referring to FIG. 4, if the known data is located in quadrant II and the I received data is −0.9 and the Q received data is 1.1 then the data is located in quadrant II with a vector angle of approximately 129.3° from the reference I axis. In accordance with Table 1 the I-data is set equal to the Q-received data such that $I_{data}=1.1$, and $Q_{data}=0.9$. The vector angle is now approximately 39.3° from the reference I axis. Thus, the vector has been rotated 90° clockwise into quadrant I. Similar operations are performed if the known data is found in quadrants III or IV. No operation is performed if the known data is found in the reference quadrant.

TABLE 1

| Quadrant of Preamble Data | Operation Performed on Received Data |
|---|---|
| Quadrant I | I_data = I_rec_data |
| | Q_data = Q_rec_data |
| Quadrant II | I_data = Q_Received_Data; |
| | Q_data = −1 *I_Received_Data |
| Quadrant III | I_data = −1 *I_Received_Data; |
| | Q_data = −1 *Q_Received_Data |
| Quadrant IV | I_data = −1 *Q_Received_Data; |
| | Q_data = I_Received_Data |

Once the data is rotated in accordance with the known data, the next step 42 determines the amount of accumulated phase error. Ideally, the data-vector should be +45° with respect to the I-axis indicating no or minimal phase error.

However, due to component differences between the transmitter 10 and receiver 17, as well as propagation path effects there is generally some phase error. Rotating 42 the vector −45° as shown in Table 2 and FIG. 4, and equating any remaining vector angle to an error signal as shown in Table 3 may determine this phase error.

TABLE 2

I_Rotated Data = I_Data + Q_Data
Q_Rotated Data = Q_Data − I_Data

Continuing the example above, the vector (1.1, 0.9) above lays at approximately +39.3° in quadrant I. Rotating this vector −45° according to Table 2 results in the vector (2, −0.2), an error angle of −5.7° counterclockwise from the I reference axis.

The alternative steps shown in Table 3 accomplish equating the error angle −5.7° to a phase error signal such that the error signal is proportional to −1*Q_rotated. In this example the error signal is proportional to −1*(−0.2) equaling +0.2.

TABLE 3

| Rotated Data Vector Angle | Error Signal Generated |
|---|---|
| Vector between 90 and −90 degrees | −1 * Q_Rotated Data |
| Vector between 90 and 135 degrees | I_Rotated Data − Q_Rotated Data |
| Vector between 135 and 180 degrees | 2 * I_Rotated Data |
| Vector between −90 and −135 degrees | −1 * (I_Rotated Data + Q_Rotated Data) |
| Vector between −135 and −180 degrees | −2 * I_Rotated Data |

See Table 4 for an alternate embodiment mapping that depends only on the sign and relative absolute magnitudes of I and Q.

TABLE 4

| Signs and Relative Magnitudes of (I_Rotated, Q_Rotated) | Range of the Angle in Degrees |
|---|---|
| (+, +) | 0 < angle < 90 |
| (+, −) | −90 < angle < 0 |
| (−, −) and \|Q\| > \|I\| | −135 < angle < −90 |
| (−, −) and \|I\| > \|Q\| | −180 < angle < −135 |
| (−, +) and \|Q\| > \|I\| | 90 < angle < 135 |
| (−, +) and \|I\| > \|Q\| | 135 < angle < 180 |

In the preferred embodiment the error signal is coupled to a second order frequency/phase loop filter 18. The filter 18 integrates the phase error signal over a unit time (a delta frequency) and outputs a predetermined portion of the phase error signal, which is then coupled to the frequency-to-phase accumulator 19. The predetermined portion determines the rate at which the phase error is corrected. In an alternate embodiment any suitable loop filter could be used.

The frequency-to-phase accumulator 19 outputs 43 a phase correction signal for input into the phase shifter 16. In an alternate embodiment the phase error signal from the phase error calculation is coupled directly to the phase shifter 16.

In an alternate embodiment it will be appreciated that a frequency control loop may be used to compare a received frequency, such as a received symbol clock with a reference frequency. If the received frequency is determined less than the predetermined value the frequency may be adjusted to conform to the reference frequency (See FIG. 2, items 16A, 18A, 19A, and 21A).

It should be understood that the foregoing description is only illustrative of the invention. Moreover, it will be readily appreciated that an advantage of the present invention is the use of rotating vectors in a phase error loop and that the rotation of the vectors may be controlled such that correction of the phase error is an orderly process. It will be further appreciated that advantages of the present invention resolve ambiguity while determining phase error but without the complicated Arc Tan operation. In addition, various alternatives and modifications can be devised by those skilled in the art without departing from the invention. Accordingly, the present invention is intended to embrace all such alternatives, modifications and variances that fall within the scope of the appended claims.

What is claimed is:

1. A method, embodied in a program of instructions executable by a machine, for compensating digital data demodulation phase uncertainty, the method comprising the steps of:
   identifying a phase reference quadrant, the phase reference quadrant comprising a phase reference axis;
   receiving known digital data;
   receiving an analog signal;
   down-converting the analog signal by demodulating an in-phase (I) signal and a quadrature (Q) signal to provide I_received data and Q_received data, respectively;
   forming a phase vector from the known digital data, determining which quadrant the phase vector is located in and rotating the phase vector to the phase reference quadrant if it is determined that the phase vector is not located in the phase reference quadrant such that:
   if the phase vector is determined to be in quadrant II, set I_data to substantially equal Q_received data and set Q_data to substantially equal −1*I_received data; or
   if the phase vector is determined to be in quadrant III, set I_data to substantially equal −1*I_received data and set Q_data to substantially equal −1*Q_received data; or
   if the phase vector is determined to be in quadrant IV, set I_data to substantially equal −1*Q_received data and set Q_data to substantially equal I_received data;
   rotating the phase vector 45° by setting an I_rotated data substantially equal to I_data+Q_data, and setting a Q_rotated data substantially equal to Q_data−I_data;
   measuring the resulting angle between the rotated phase vector and the phase reference axis; and
   generating a phase error signal proportional to the resulting angle.

2. The method of claim 1, wherein generating a phase error signal proportional to the resulting angle comprises generating a phase error signal −1*Q_rotated data if the rotated phase vector lies between 90 and −90 degrees.

3. The method of claim 1, wherein generating a phase error signal proportional to the resulting angle comprises generating a phase error signal I_rotated data−Q_rotated data if the rotated phase vector lies between 90 and 135 degrees.

4. The method of claim 1, wherein generating a phase error signal proportional to the resulting angle comprises generating a phase error signal 2*I_rotated data if the rotated phase vector lies between 135 and 180 degrees.

5. The method of claim 1, wherein generating a phase error signal proportional to the resulting angle comprises generating a phase error signal −1*(I_rotated data−Q_rotated data) if the rotated phase vector lies between −90 and −135 degrees.

6. The method of claim 1, wherein generating a phase error signal proportional to the resulting angle comprises generating a phase error signal −2*I_rotated data if the rotated phase vector lies between −135 and −180 degrees.

7. A program storage device readable by a machine, tangibly embodying a program of instructions executable by the machine to perform method steps for compensating digital data demodulation phase uncertainty, the method comprising the steps of:
   identifying a phase reference quadrant, the phase reference quadrant having a phase reference axis;
   receiving known digital data;
   receiving an analog signal;
   down-converting the analog signal by demodulating an in-phase (I) signal and a quadrature (Q) signal to provide I-received data and O-received data, respectively;
   driving a frequency error to be less than a predetermined percentage of a symbol rate;
   forming a phase vector from the known digital data, determining which quadrant the phase vector is located in and rotating the phase vector to the phase reference quadrant if it is determined that the phase vector is not located in the reference quadrant;
   rotating the phase vector −45°;
   measuring the resulting angle between the rotated phase vector and the phase reference axis; and
   generating a phase error signal proportional to the resulting angle.

8. A program storage device as in claim 7 wherein the program of instructions comprise at least one Very High Speed Integrated Circuit (VHSIC) Hardware Description (VHDL) Language file.

9. The program storage device of claim 7, wherein generating a phase error signal proportional to the resulting angle comprises generating a phase error signal −1*Q_rotated data if the rotated phase vector lies between 90 and −90 degrees.

10. The program storage device of claim 7, wherein generating a phase error signal proportional to the resulting angle comprises generating a phase error signal I_rotated data−Q_rotated data if the rotated phase vector lies between 90 and 135 degrees.

11. The program storage device of claim 7, wherein generating a phase error signal proportional to the resulting angle comprises generating a phase error signal 2*I_rotated data if the rotated phase vector lies between 135 and 180 degrees.

12. The program storage device of claim 7, wherein generating a phase error signal proportional to the resulting angle comprises generating a phase error signal −1*(I_rotated data−Q_rotated data) if the rotated phase vector lies between −90 and −135 degrees.

13. The program storage device of claim 7, wherein generating a phase error signal proportional to the resulting angle comprises generating a phase error signal −2*I_rotated data if the rotated phase vector lies between −135 and −180 degrees.

14. A method, embodied in a program of instructions executable by a machine, for compensating digital data demodulation phase uncertainty, the method comprising the steps of:
   identifying a phase reference quadrant, the phase reference quadrant comprising a phase reference axis;
   receiving known digital data;
   forming a phase vector from the known digital data, determining which quadrant the phase vector is located in and rotating the phase vector to the phase reference quadrant if it is determined that the phase vector is not located in the phase reference quadrant;
   rotating the phase vector 45°, the rotated phase vector having components I_rotated data and Q_rotated data;
   measuring the resulting angle between the rotated phase vector and the phase reference axis; and
   generating a phase error signal proportional to the resulting angle such that:
      if the rotated phase vector lies between 90 and −90 degrees, setting the phase error signal as −1*Q_rotated data; or
      if the rotated phase vector lies between 90 and 135 degrees, setting the phase error signal as I_rotated data−Q_rotated data; or
      if the rotated phase vector lies between 135 and 180 degrees, setting the phase error signal as 2*I_rotated data; or
      if the rotated phase vector lies between −90 and −135 degrees, setting the phase error signal as −1*(I_rotated data+Q_rotated data); or
      if the rotated phase vector lies between −135 and −180 degrees, setting the phase error signal as −2*I_rotated data.

15. The method of claim 14, wherein rotating the phase vector −45° comprises setting I_rotated data substantially equal to I_data+Q_data and setting Q_rotated data substantially equal to Q_data−I_data, wherein I_data and Q_data are derived from the known digital data.

* * * * *

UNITED STATES PATENT AND TRADEMARK OFFICE
CERTIFICATE OF CORRECTION

PATENT NO. : 7,164,733 B1
APPLICATION NO. : 10/273929
DATED : January 16, 2007
INVENTOR(S) : Griffin et al.

It is certified that error appears in the above-identified patent and that said Letters Patent is hereby corrected as shown below:

Claim 1: Column 6, line 48, delete "vector 45°" and insert --vector -45°-- as indicated in the originally filed application.

Claim 7: Column 7, line 21, delete "O-received data" and insert --Q-received data-- as it appears in the Amendment filed July 11, 2006.

Signed and Sealed this

Tenth Day of April, 2007

JON W. DUDAS
*Director of the United States Patent and Trademark Office*